Patented Nov. 11, 1952

2,617,787

UNITED STATES PATENT OFFICE 2,617,787

QUATERNARY INTERPOLYMERS OF (A) CERTAIN 2-ALKENYL ESTERS OF ALPHA-OLEFINIC POLYCARBOXYLIC ACIDS, (B) CERTAIN MONOVINYL BENZENES, (C) CERTAIN MONOOLEFINIC CARBOXYLIC ESTERS, AND (D) CERTAIN 2-ALKENYL ALCOHOLS, CHLORIDES, ETHERS, OR ESTERS

Pliny O. Tawney, Passaic, N. J., assignor to United States Rubber Company, New York, N. Y., a corporation of New Jersey No Drawing. Application October 27, 1949, Serial No. 123,973

6 Claims. (Cl. 260—78.5)

This invention relates to a novel class of soluble unsaturated resins derived from a 2-alkenyl ester of an alpha-olefinic polycarboxylic acid, a monovinyl benzene, a monoolefinic carboxylic ester and a 2-alkenyl alcohol, chloride, monoether or ester of a monocarboxylic acid and to a method of making the same. The new quaternary interpolymers of my invention are capable of undergoing further polymerization to an insoluble and substantially infusible state when heated, particularly in the presence of catalysts. Hence, they find immediate application in the field of coating and molding resins, wherein an initially soluble, fusible resin is required which is capable of undergoing a subsequent cure to a solvent- and heat-resistant state.

Addition-type thermosetting resins such as those derived from 2-alkenyl esters of alpha-olefinic polycarboxylic acids, e. g., diallyl fumarate, are of great interest to the coating industry because of their resistance to discoloration at elevated temperatures required for their cure and likewise often encountered during service. I have found that the utility of such resins can be improved by interpolymerization with a monovinyl benzene whereby products obtained are of improved gloss, better dielectric properties, greater toughness and possessing an initial compatibility with the cheap hydrocarbon solvents employed as diluents and thinners in the coating art. However, for coating of base materials which are subject to considerable flexing, e. g., metal sheets and foil, these interpolymers are somewhat deficient with respect to permanent flexibility. I have further found that markedly improved flexibility can be attained by interpolymerizing the 2-alkenyl ester of an alpha-olefinic polycarboxylic acid and the monovinyl benzene with a monoolefinic carboxylic ester, and, moreover, that such products possess improved mar-resistance.

Despite the satisfactory technical performance of such resins, however, their widespread application has been hindered by the economic disadvantages inherent in their preparation, wherein the reaction mixture gels to an insoluble, intractable mass before more than a minor proportion of the monomeric reactants has been converted to the interpolymeric form. The reaction mixture must then be fractionated by some method to remove the useless gelled material and after separation of the desired soluble interpolymer, the large amounts of unreacted monomers must be recovered, purified and recycled for use in subsequent interpolymerizations.

I have now discovered a novel method whereby this disadvantageous, premature gelation can be postponed or averted and a much greater or even the major proportion of the unreacted monomers converted to the soluble, interpolymeric form. The method of my invention consists in carrying out the interpolymerization in the presence of a copolymerizable monoolefinic 2-alkenyl compound from the class of 2-alkenyl alcohols, 2-alkenyl chlorides, 2-alkenyl monoethers of monohydric alcohols or phenols devoid of olefinic and acetylenic unsaturation and 2-alkenyl esters of monocarboxylic acids devoid of olefinic and acetylenic unsaturation, all of which may be represented by the type formula $XCH=CX-CH_2-Z$ where one X is hydrogen and the other X is a radical from the class of hydrogen, chlorine, chloromethyl, hydroxymethyl and lower alkyl (e. g., methyl and ethyl), and Z may be one of the radicals hydroxyl, chlorine, alkoxy (e. g., methoxy, ethoxy, beta-hydroxyethoxy, propoxy, isopropoxy, n-butoxy, isobutoxy, amyloxy, hexoxy, heptoxy, octoxy, nonoxy, decoxy), aryloxy (e. g., phenoxy, tolyloxy), aralkoxy (e. g., benzyloxy), and acyloxy (e. g., acetoxy, propionoxy, isobutyroxy, valeroxy, benzoyloxy). Illustrative of such compounds are allyl chloride, methallyl chloride, crotyl chloride, 2,3-dichloropropene, 1,4-dichlorobutene-2, 2-(chloromethyl)allyl chloride, allyl alcohol, methallyl alcohol, 2-chloroallyl alcohol, crotyl alcohol, 2-ethylallyl alcohol, allyl methyl ether, methallyl ethyl ether, beta-allyloxyethanol, allyl propyl ether, methallyl butyl ether, methallyl amyl ether, methallyl heptyl ether, allyl octyl ether, crotyl ethyl ether, 2-chloroallyl ethyl ether, methallyl phenyl ether, allyl benzyl ether, allyl acetate, 2-chloroallyl propionate, methallyl butyrate, ethallyl valerate and allyl benzoate. Among such copolymerizable, monoolefinic, 2-alkenyl compounds, the alcohols and chlorides are generally the most effective in repressing gelation of my polymerizable ester-mixture, while the corresponding allylic monoethers and mono-esters yield interpolymers of greater softness, flexibility and resistance to hydroxylic solvents. The 2-alkenyl compounds of the above type formula which contain a terminal methylene group, $CH_2=CX-CH_2-Z$, are preferred.

I have found that as little as 0.2 mole of any of the last mentioned above type of copolymerizable 2-alkenyl compounds, per mole of the 2-alkenyl ester of an alpha-olefinic polycarboxylic acid in the reaction mixture, is sufficient to effect an increased conversion of the 2-alkenyl ester of an alpha-olefinic polycarboxylic acid, the monovinyl benzene and the monoolefinic carboxylic ester present, to the soluble interpolymeric form before gelation, and when about 3 moles or more, e. g., 3 to 7 moles of the 2-alkenyl compound per mol of 2-alkenyl ester of an alpha-olefinic polycarboxylic acid is present, the major proportion of the other three monomers can be converted to the soluble interpolymeric form without danger of premature insolubilization. Generally speaking, I use an amount of the 2-alkenyl alcohol, chloride, ether or ester such that at least 50% of the other three monomers is converted to soluble interpolymeric form. Often I use an even greater amount of the 2-alkenyl compound, say an amount ranging upwardly to a molar ratio thereof to the 2-alkenyl ester of an alpha-olefinic polycarboxylic acid as high as 20:1 or even higher. By the use of such excesses, the 2-alkenyl compound serves not only to repress gelation but also as a diluent for the polymerizing mixture. Thus, while I may use any amount of the 2-alkenyl compound ranging upwardly from 0.2 mole per mole of 2-alkenyl ester of an alpha-olefinic polycarboxylic acid, in some cases I use an amount ranging from 3 moles to 7 moles per mole of 2-alkenyl ester of an alpha-olefinic polycarboxylic acid, but more commonly I employ an amount ranging from 7 moles to 20 moles per mole of 2-alkenyl ester of an alpha-olefinic polycarboxylic acid. The use of more than 20 moles is usually undesirable as presenting an excessive recovery problem.

If desired an inert diluent may be present in the reaction mixture. Examples of suitable inert diluents which are solvents not only for the monomers but also for the soluble, unsaturated polymer produced are benzene, toluene and xylene. When such diluents are employed, a lower mole ratio of 2-alkenyl alcohol, chloride, ether or ester to 2-alkenyl ester of an alpha-olefinic polycarboxylic acid may be used.

Suitable 2-alkenyl esters of alpha-olefinic polycarboxylic acids for my invention include the esters of 2-alkenols of the formula

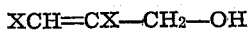

where the X's are as defined above, with alpha-olefinic polycarboxylic acids such as fumaric, maleic, itaconic, citraconic, mesaconic and aconitic acids, in their order of preference, based on performance, reactivity, cost and availability. Illustrative of such esters are diallyl fumarate, dimethallyl fumarate, di-2-chloroallyl fumarate, diallyl maleate, diallyl itaconate, diallyl citraconate, dimethallyl citraconate, diallyl mesaconate and triallyl aconitate.

Besides monovinyl benzene (styrene), various substituted monovinyl benzenes are operable in my invention and include alpha- and para-substituted styrenes, e. g., p-chlorostyrene, p-methylstyrene, alpha-methylstyrene, p-cyanostyrene, and 2,5-dichlorostyrene. Thus the monovinyl benzene may be substituted in the alpha position or on the ring, especially in the para position, with substituents which do not interfere with its copolymerizability with the other monomeric materials employed or with the utility of the resulting interpolymer, examples of such substituents being methyl, ethyl, chloro and cyano. The monovinyl benzene or substituted monovinyl benzene may be employed in amounts of from about 0.5 to 6 moles per mole of the 2-alkenyl ester of an alpha-olefinic polycarboxylic acid present and often in amounts ranging from 0.75 to 2 moles per mole of said 2-alkenyl ester of an alpha-olefinic polycarboxylic acid.

The preferred monoolefinic carboxylic esters include vinyl and isopropenyl esters of monocarboxylic acids devoid of olefinic and acetylenic unsaturation (e. g., vinyl acetate, isopropenyl acetate, vinyl propionate, isopropenyl propionate, vinyl butyrate, isopropenyl butyrate, vinyl 2-ethylhexanoate, and vinyl benzoate) and esters of monohydric alcohols or phenols devoid of olefinic and acetylenic unsaturation with monoolefinic carboxylic acids (e. g., methyl acrylate, butyl acrylate, phenyl acrylate, benzyl acrylate, tolyl acrylate, methyl methacrylate, butyl methacrylate, methyl chloroacrylate, diethyl fumarate, diethyl maleate, diethyl itaconate, di(2-ethylhexyl) itaconate, dimethyl mesaconate, diethyl citraconate, and trimethyl aconitate) of which the lower alkyl esters are preferred. These monoolefinic carboxylic esters are ordinarily employed in amounts of from 0.1 to 4 moles per mole of 2-alkenyl ester of an alpha-olefinic polycarboxylic acid present and more commonly in amounts ranging from 0.1 to 1 mole per mole of said 2-alkenyl ester of an alpha-olefinic polycarboxylic acid.

In the practice of my invention, the monomeric reactants are heated together at elevated temperatures preferably ranging from 50° C. to 120° C., with from about 0.1 to 10% by weight of a material capable of thermally decomposing to yield free radicals, e. g., a peroxide such as benzoyl peroxide, acetyl peroxide, or tertiary-butyl hydrogen peroxide. I usually terminate the reaction before any substantial amount of gel occurs. The course of the reaction can be followed by observing the increase in the viscosity of the reaction mixture and at the conclusion of the reaction, the soluble, unsaturated interpolymer can be isolated by precipitation with a nonsolvent, e. g., n-hexane, or by evaporation of any unreacted starting materials. In the formulation of coating compositions, it is often convenient to dilute the crude interpolymerization reaction mixture with an appropriate solvent, e. g., xylene, and then distill off the unreacted copolymerizable 2-alkenyl compound,

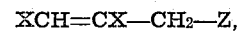

which is usually employed in excess during the interpolymerization to serve both as a diluent and as a copolymerizable represser of gelation. The resulting solution can then be admixed with suitable addends including dyes, pigments, fillers and plasticizers, prior to application.

Alternatively my interpolymers can be isolated as polymeric solids which can be employed in molding or casting operations either alone, in conjunction with the above-mentioned addends, or together with liquid polymerizable olefinic compounds such as styrene, diethyl fumarate, vinyl acetate and n-butyl methacrylate.

Application of heat at temperatures of 100° to 220° C., in the presence or absence of polymerization catalysts especially peroxides such as those mentioned above, induces further polymerization of compositions containing my new soluble, unsaturated interpolymers whereby solvent- and heat-resistant products are obtained. The temperature required to advance the interpolymer to insoluble, infusible state will depend on many factors such as the amount of polymerization catalyst.

The following examples disclose my invention in more detail; all parts are by weight.

*Example 1*

(a) A mixture of 39.2 parts of diallyl fumarate, 6.9 parts of diethyl fumarate, 20.8 parts of styrene, 256 parts of methallyl alcohol and 1.0 part of benzoyl peroxide is heated at ca. 90–95° C. for 3 hours after which 1.9 parts of benzoyl peroxide are added and heating is continued for an additional 3 hours. The reaction mixture is then cooled, diluted with several volumes of n-hexane and the precipitated interpolymer is purified by re-dissolving it in a minimum volume of acetone and precipitating it with n-hexane. After drying in vacuum to constant weight, 72.2 parts of the quaternary interpolymer are obtained; iodine number (Wijs)=105. Upon being heated at 200° C. a film of the interpolymer becomes insoluble in acetone and xylene.

(b) When the above interpolymerization is repeated in the absence of the methallyl alcohol, and using only 0.5 part of benzoyl peroxide, the reaction mixture begins to gel in 28 minutes and only 17.7 parts of interpolymer are obtained.

(c) A 70% solution of the soluble interpolymer prepared in 1–a above, in diallyl fumarate and containing 2% of benzoyl peroxide is poured into a cylindrical mold and cured by heating for 16 hours at 60° C. and subsequently for 5 hours at 100° C. The resulting clear, acetone-resistant casting has a hardness of M92 on the Rockwell scale.

*Example 2*

In the manner of Example 1–a above, a mixture of 98 g. of diallyl fumarate, 65 g. of styrene, 21.5 g. of diethyl fumarate, 216 g. of allyl alcohol and 6 g. of benzoyl peroxide, all dissolved in 216 g. of xylene is heated at reflux for 20 hours with no evidence of gelation.

An aliquot of the reaction mixture is withdrawn and the quaternary interpolymer is isolated therefrom as in Example 1–a. The yield of polymeric product corresponds to about 92 g. of interpolymer from the entire reaction mixture.

A sample of the crude reaction mixture is poured onto a glass plate and baked at 200° C. to form a clear, hard film which is insoluble in acetone and in xylene.

*Example 3*

A mixture of 98.1 parts of diallyl fumarate, 52.1 parts of styrene, 34.4 parts of vinyl acetate, 400 parts of allyl alcohol and 3.9 parts of benzoyl peroxide is heated for 4 hours at 95–96° C. to yield about 155.4 parts of a soluble quaternary interpolymer; iodine number (Wijs)=118.8.

Upon heating at 200° C., a sample of the interpolymer is converted to an acetone-insoluble product.

Having thus described my invention, what I claim and desire to protect by Letters Patent is:

1. An acetone-soluble, unsaturated, quaternary interpolymer of monomers consisting of (A) monomeric diallyl fumarate, (B) monomeric styrene, (C) monomeric diethyl fumarate, and (D) monomeric methallyl alcohol, the relative proportions of said monomeric materials in the initial monomeric charge ranging from 0.75 to 2 moles of (B), from 0.1 to 1 mole of (C) and from 7 to 20 moles of (D) per mole of (A).

2. An acetone-soluble, unsaturated, quaternary interpolymer of monomers consisting of (A) monomeric diallyl fumarate, (B) monomeric styrene, (C) monomeric diethyl fumarate, and (D) monomeric allyl alcohol, the relative proportions of said monomeric materials in the initial monomeric charge ranging from 0.75 to 2 moles of (B), from 0.1 to 1 mole of (C) and from 7 to 20 moles of (D) per mole of (A).

3. An acetone-soluble, unsaturated, quaternary interpolymer of monomers consisting of (A) monomeric diallyl fumarate, (B) monomeric styrene, (C) monomeric vinyl acetate, and (D) monomeric allyl alcohol, the relative proportions of said monomeric materials in the initial monomeric charge ranging from 0.75 to 2 moles of (B), from 0.1 to 1 mole of (C) and from 7 to 20 moles of (D) per mole of (A).

4. An acetone-soluble, heat-convertible, unsaturated, quaternary interpolymer of monomers consisting of (A) a monomeric ester of an alcohol having the formula $XCH=CX-CH_2-OH$ where one X is hydrogen and the other X is a radical selected from the group consisting of hydrogen, chlorine, chloromethyl, hydroxymethyl and lower alkyl with an alpha-olefinic polycarboxylic acid, (B) a monomeric monovinyl benzene selected from the group consisting of styrene, p-chlorostyrene, p-methylstyrene, alpha-methyl styrene, p-cyanostyrene, and 2,5-dichlorostyrene, (C) a polymerizable monomeric monoolefinic carboxylic ester selected from the group consisting of vinyl and isopropenyl esters of monocarboxylic acids devoid of olefinic and acetylenic unsaturation and esters of monohydric alcohols and phenols devoid of olefinic and acetylenic unsaturation with monoolefinic carboxylic acids, and (D) a monomeric compound having the formula $XCH=CX-CH_2-Z$ where one X is hydrogen and the other X is a radical selected from the group consisting of hydrogen, chlorine, chloromethyl, hydroxymethyl and lower alkyl, and Z is a radical selected from the group consisting of hydroxyl, chlorine, alkoxy, aryloxy, aralkoxy and monocarboxylic acyloxy devoid of olefinic and acetylenic unsaturation, the relative proportions of said monomeric materials in the initial monomeric charge ranging from 0.5 to 6 moles of (B), from 0.1 to 4 moles of (C) and from 0.2 to 20 moles of (D) per mole of (A).

5. An acetone-soluble, heat-convertible, unsaturated, quaternary interpolymer of monomers consisting of (A) a monomeric ester of an alcohol having the formula $XCH=CX-CH_2-OH$ where one X is hydrogen and the other X is a radical selected from the group consisting of hydrogen, chlorine, chloromethyl, hydroxymethyl and lower alkyl with an alpha-olefinic polycarboxylic acid, (B) a monomeric monovinyl benzene selected from the group consisting of styrene, p-chlorostyrene, p-methylstyrene, alpha-methyl styrene, p-cyanostyrene, and 2,5-dichlorostyrene, (C) a polymerizable monomeric monoolefinic carboxylic ester selected from the group consisting of vinyl and isopropenyl esters of monocarboxylic acids devoid of olefinic and acetylenic unsaturation and esters of monohydric alcohols and phenols devoid of olefinic and acetylenic unsaturation with monoolefinic carboxylic acids, and (D) a monomeric compound having the formula $XCH=CX-CH_2-Z$ where one X is hydrogen and the other X is a radical selected from the group consisting of hydrogen, chlorine, chloromethyl, hydroxymethyl and lower alkyl, and Z is a radical selected from the group consisting of hydroxyl, chlorine, alkoxy, aryloxy, aralkoxy and monocarboxylic acyloxy devoid of olefinic and acetylenic unsaturation, the relative proportions of said monomeric materials in the initial monomeric charge ranging from 0.75 to 2 moles of (B), from 0.1 to 1 mole of (C) and from 7 to 20 moles of (D) per mole of (A).

6. A method of making an acetone-soluble, heat-convertible, unsaturated, quaternary interpolymer which comprises heating a mixture of monomers consisting of (A) a monomeric ester of an alcohol having the formula $$XCH=CX-CH_2-OH$$

where one X is hydrogen and the other X is a radical selected from the group consisting of hydrogen, chlorine, chloromethyl, hydroxymethyl and lower alkyl with an alpha-olefinic polycarboxylic acid, (B) a monomeric monovinyl benzene selected from the group consisting of styrene, p-chlorostyrene, p-methylstyrene, alpha-methyl styrene, p-cyanostyrene, and 2,5-dichlorostyrene, (C) a polymerizable monomeric monoolefinic carboxylic ester selected from the group consisting of vinyl and isopropenyl esters of monocarboxylic acids devoid of olefinic and acetylenic unsaturation and esters of monohydric alcohols and phenols devoid of olefinic and acetylenic unsaturation with monoolefinic carboxylic acids, and (D) a monomeric compound having the formula $XCH=CX-CH_2-Z$ where one X is hydrogen and the other X is a radical selected from the group consisting of hydrogen, chlorine, chloromethyl, hydroxymethyl and lower alkyl, and Z is a radical selected from the group consisting of hydroxyl, chlorine, alkoxy, aryloxy, aralkoxy and monocarboxylic acyloxy devoid of olefinic and acetylenic unsaturation, the relative proportions of said monomeric materials in the initial monomeric charge ranging from 0.5 to 6 moles of (B), from 0.1 to 4 moles of (C) and from 0.2 to 20 moles of (D) per mole of (A), in the presence of an organic peroxide polymerization catalyst, and terminating the reaction before gelation takes place.

PLINY O. TAWNEY.

REFERENCES CITED

The following references are of record in the file of this patent:

UNITED STATES PATENTS

| Number | Name | Date |
|---|---|---|
| 2,403,213 | D'Alelio | July 2, 1946 |
| 2,431,374 | D'Alelio | Nov. 25, 1947 |
| 2,441,515 | Snyder | May 11, 1948 |
| 2,498,099 | Tawney et al. | Feb. 21, 1950 |

FOREIGN PATENTS

| Number | Country | Date |
|---|---|---|
| 606,080 | Great Britain | Aug. 5, 1948 |